United States Patent Office 3,493,613
Patented Feb. 3, 1970

3,493,613
**AMIDE DERIVATIVE OF DEHYDROABIETYL-
AMINE AND PANTOLACTONE**
Rudolf Kubela, Cote St. Luc, Quebec, Canada (834
Charlotte St., Fredericton, New Brunswick, Canada),
and Geza S. Delmar, 20580 Lakeshore Drive, Baie
d'Urfe, Quebec, Canada
No Drawing. Filed May 22, 1967, Ser. No. 640,395
Claims priority, application Canada, July 19, 1966,
965,843
Int. Cl. C07c $103/34$
U.S. Cl. 260—562                                          3 Claims

ABSTRACT OF THE DISCLOSURE

Pantoyl dehydroabietylamides and diastereoisomers thereof are shown together with the method of preparing them. The d (—) amide is useful in the preparation of d-calcium pantonthenate via the d-pantolactone and the l (+) amide is useful as an industrial bacteriostat or fungistat.

---

The present invention relates to novel amides related to d (—)- and l (+)-pantoic acid. More particularly it relates to pantoyl dehydroabietylamides represented by the following formula:

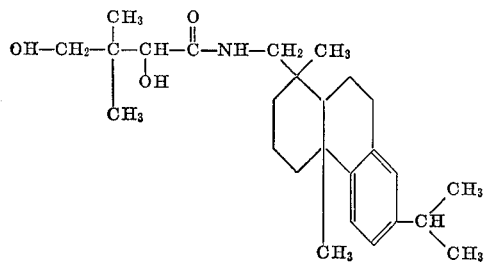

It is an object of the present invention to describe the diastereoisomeric amides obtained from the reaction of dehydroabietylamine with d (—)- or l (+)-pantolactone and also to describe the preparation of said compounds.

The two amides of the present invention differ from each other by the spatial arrangement of the substituents on the α-carbon of the pantoic acid moiety. They do exhibit, however, different physical properties due to the fact that the dehydroabietylamine moiety is in itself optically active. The two amides are therefore diastereoisomers and as such differ in melting points, optical rotations and also in the position of the carbonyl absorptions of their infrared spectra.

The l (+)-pantoyl dehydroabietylamine has been found to be useful as industrial bacteriostat or fungistat as shown by the inhibition of growth of *Aspergillus niger* and *Bacillus subtilis*. The d (—)-pantoyl dehydroabietylamine on the other hand is a most useful chemical intermediate.

The amides of the present invention are prepared by reacting the appropriate γ-lactone of pantoic acid, hereinafter referred to as pantolactone, and which has the formula:

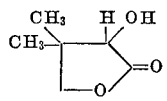

with dehydroabietylamine represented by the formula:

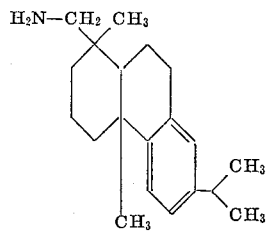

As stated earlier, pantolactone exists in two optically active forms known as l (+)- and d (—)-pantolactone. The l (+) form is characterized by $[\alpha]_D^{25}$ of $+50.1°$, whereas the d (—) form has a negative rotation of substantially the same order. The racemic mixture, also called d, l-pantolactone has on the other hand no effect on the polarized light. It has now been found that when reacting d, l-pantolactone with dehydroabietylamine, the two diastereoisomeric amides formed can easily be separated from each other and obtained in a substantially pure form. The advantages of this discovery are obvious. In addition to bacterio-statically active amide corresponding to l (+)-pantolactone also the second diastereoisomer, corresponding to d (—)-pantolactone can be recovered in substantially pure form and used e.g. for the preparation of d-calcium pantothenate, which is an important food supplement for domestic animals.

More specifically, the products of the present invention are prepared by heating pantolactone with an approximately equimolar amount of dehydroabietylamine at temperatures ranging between 50–110° C. whereby the amides desired are readily formed. It is however, to be understood that at lower reaction temperatures the reaction times are necessarily longer than at more elevated temperatures. Temperatures ranging between 80–110° C. were found to be preferable, as at lower temperatures the rate of reaction was not sufficiently fast to be practical, whereas at temperatures higher than 110° C. some decomposition of dehydroabietylamine was found to take place. The reactions could be carried out in presence or absence of an organic solvent. Due to the low melting points of both the dehydroabietylamines and the pantolactones a melt reaction in the absence of an organic solvent was found preferable. The reaction products could be readily purified by recrystallizations from appropriate solvents.

For a fuller understanding of the nature and objects of this invention, reference may be made to the following examples, which are given merely to illustrate the invention and are not to be construed in a limiting sense.

EXAMPLE 1

A mixture of 57 g. of dehydroabietylamine and 26 g. of d (—)-pantolactone was kept at a temperature of 100–110° C. overnight with stirring. To the still warm reaction mixture benzene was added, then some hexane and the crystalline reaction product was collected by filtration. After recrystallization from benzene-hexane and eventually from ethanol a high yield of a substantially pure amide was obtained, having an M.P. of 150–1° C. and characterized by an amide carbonyl absorption in infrared light appearing at about 1665 cm.$^{-1}$.

*Analysis.*—Calcd. for $C_{26}H_{41}NO_3$: C, 75.15; H, 9.94; N, 3.37%. Found: C, 75.51; H, 9.92; N, 3.58%.

EXAMPLE 2

A mixture of 57 g. of dehydroabietylamine and 26 g. of l (+)-pantolactone was stirred overnight at a temperature of about 100° C. After addition of benzene the still warm reaction mixture was allowed to cool to room temperature. The crystalline reaction product was collected by filtration and recrystallized from benzene. A high yield of a substantially pure amide was obtained, having an M.P. of 147° C. and characterized by an amide carbonyl absorption in infrared light appearing at about 1620 cm.$^{-1}$.

*Analysis.*—Calc. for $C_{26}H_{41}NO_3$: C, 75.15; H, 9.94; N, 3.37%. Found: C, 74.77; H, 10.00; N, 3.64%.

EXAMPLE 3

A mixture of 5 g. of dehydroabietylamine and 26 g. of racemic pantolactone was stirred at about 100° C. overnight. To the still hot reaction mixture about 400 ml. of hot toluene were added and the solution cooled over a period of about two hours to 0°–10° C. The crystalline precipitate was collected by filtration and recrystallized from benzene, to give high yield of the amide having an M.P. of 147° C.

The filtrate was concentrated to a small volume, 200 ml. of hexane were added and the suspension of the crystalline solid was stirred at reflux temperature for one hour. After cooling to room temperature the crystalline product was collected by filtration and recrystallized from benzene-hexane mixture. A high yield of the amide having an M.P. of 151° C. was so obtained

EXAMPLE 4

A solution of 57 g. of dehydroabietylamine and 26 g. of racemic pantolactone in 25 ml. of benzene was refluxed overnight. The reaction mixture was worked up in the same way as in Example 3 and the two diastereoisomeric amides were obtained in similar yields.

EXAMPLE 5

83 g. of the amide having an M.P. of 151° C. as obtained according to the procedures described in Examples 3 or 4 were dissolved in 100 ml. of ethanol at 70° C. 22 g. of 37% hydrochloric acid were added and the mixture refluxed for 2 hours. After cooling to about 45° C. a solution of 19 g. of sodium hydroxide in 25 ml. of water was added. The mixture was then cooled to room temperature and the separated dehydroabietylamine was removed by extraction with chloroform. The aqueous layer was acidified to a pH of about 1.0 and refluxed for 30 mintues. After cooling to room temperature and neutralization a high yield of d (—)-pantolactone was obtained by extraction with chloroform and evaporation of the solvent in vacuo. This pantolactone had $[\alpha]_D^{25}$ of —40–42°, which was increased by recrystallization from benzene-hexane mixture to $[\alpha]_D^{25}$ of —48°–50°.

We claim:
1. Pantoyl dehydroabietylamide.
2. A chemical compound according to claim 1 wherein the structural formula is

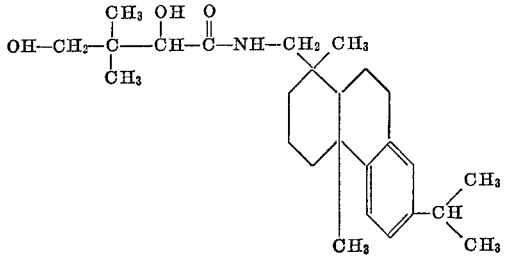

and further characterized by a melting point of about 150–151° C. and by an amide carbonyl absorption in infrared light appearing at about 1665 cm.$^{-1}$.

3. A chemical compound according to claim 1 wherein the structural formula is and further characterized by a melting point of about 147° C. and by an amide carbonyl absorption in infrared light appearing at about 1620 cm.$^{-1}$.

References Cited

UNITED STATES PATENTS 2,898,301  11/1956  Mayhew et al. _____ 252—51.5

HENRY N. JILES, Primary Examiner
HARRY I. MOATZ, Assistant Examiner

U.S. Cl. X.R.
260—343.6, 535

UNITED STATES PATENT OFFICE
CERTIFICATE OF CORRECTION

Patent No. 3,493,613                                        February 3, 197

Rudolf Kubela et al.

It is certified that error appears in the above identified patent and that said Letters Patent are hereby corrected as shown below:

Column 3, line 11, "5 g." should read -- 57 g. --.

Signed and sealed this 22nd day of December 1970.

(SEAL)
Attest:

Edward M. Fletcher, Jr.                      WILLIAM E. SCHUYLER, JR.
Attesting Officer                                  Commissioner of Patents